US008312179B2

(12) United States Patent
Matton et al.

(10) Patent No.: US 8,312,179 B2
(45) Date of Patent: *Nov. 13, 2012

(54) METHOD AND APPARATUS FOR ENABLING ENHANCED USB INTERACTION

(75) Inventors: Maxime Matton, Waterloo, CA (US); Christopher Pattenden, Waterloo, CA (US); Robert H. Wood, Waterloo, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 6 days.

This patent is subject to a terminal disclaimer.

(21) Appl. No.: 13/238,962

(22) Filed: Sep. 21, 2011

(65) Prior Publication Data

US 2012/0011285 A1      Jan. 12, 2012

Related U.S. Application Data

(63) Continuation of application No. 12/720,458, filed on Mar. 9, 2010, now Pat. No. 8,037,211, which is a continuation of application No. 11/530,549, filed on Sep. 11, 2006, now Pat. No. 7,707,323.

(51) Int. Cl.
*G06F 3/00* (2006.01)
(52) U.S. Cl. ............................................. 710/8; 710/15
(58) Field of Classification Search ........................ 710/8
See application file for complete search history.

(56) References Cited

U.S. PATENT DOCUMENTS

| 5,974,486 | A | 10/1999 | Siddappa |
| 6,813,650 | B1 | 11/2004 | Cato et al. |
| 6,813,669 | B1 | 11/2004 | Cato et al. |
| 7,707,323 | B2 * | 4/2010 | Matton et al. ..................... 710/8 |
| 7,711,863 | B2 * | 5/2010 | Matton et al. ..................... 710/8 |
| 8,037,211 | B2 * | 10/2011 | Matton et al. ..................... 710/8 |
| 2003/0013434 | A1 | 1/2003 | Rosenberg et al. |

(Continued)

FOREIGN PATENT DOCUMENTS

EP        1672492 A1     6/2006

(Continued)

OTHER PUBLICATIONS

Matton, Maxime, et al.; U.S. Appl. No. 11/530,549, filed Sep. 11, 2006; Title: Method and Apparatus for Enabling Enhanced USB Interaction.

(Continued)

*Primary Examiner* — Henry Tsai
*Assistant Examiner* — John Roche
(74) *Attorney, Agent, or Firm* — Conley Rose, P.C.; J. Robert Brown, Jr.

(57) ABSTRACT

Systems and methods for configuring a universal serial bus (USB) including for connection by a peripheral device by detecting an attach event at a USB port on the peripheral device; receiving, at the USB port, a first request for device identification; sending, at the USB port, a first identification data; receiving, at the USB port, a query related to the first identification data, the query indicating software associated with the vendor identifier is supported by the sender of the query; simulating a detach and then an attach at the USB port; receiving, at the USB port, a second request for device identification; and sending, at the USB port, a second identification data that includes an indication that the peripheral device supports at least one function from a plurality of functions that are different from the functionality defined by a generic device class code.

16 Claims, 6 Drawing Sheets

U.S. PATENT DOCUMENTS

2006/0053244 A1 3/2006 Fruhauf et al.
2006/0143319 A1 6/2006 Hsu et al.

FOREIGN PATENT DOCUMENTS

WO 9901820 A1 1/1999
WO 03012577 A2 2/2003

OTHER PUBLICATIONS

Matton, Maxime, et al.; U.S. Appl. No. 12/720,458, filed Mar. 9, 2010; Title: Method and Apparatus for Enabling Enhanced USB Interaction.
Matton, Maxime, et al.; U.S. Appl. No. 11/530,553, filed Sep. 21, 2006; Title: Method and Apparatus for Variability Enabling USB Interaction.
Reston Condit Microchip Technology, Inc.; "Demonstrating the Soft Detach Function with a PS/2 to USB Translator Example;" TB058; 2004 Microchip Technology Inc.; 8 pages.
Henry, Trenton, et al.; "Universal Serial Bus Device Class Specification for Device Firmware Upgrade;" Version 1.1; Aug. 5, 2004; 47 pages.
ATMEL Corporation; "Software User Guide;" AT89C5131A Starter Kit; Nov. 2004; 14 pages.
Compaq, et al.; "Universal Serial Bus Specification;" Revision 2.0; Apr. 27, 2000; 88 pages.
Compaq, et al.; "Universal Serial Bus Specification;" Revision 1.1; Sep. 23, 1998; 327 pages.
Office Action dated Mar. 26, 2008; U.S. Appl. No. 11/530,549, filed Sep. 11, 2006; 65 pages.
Office Action dated Oct. 3, 2008; U.S. Appl. No. 11/530,549, filed Sep. 11, 2006; 59 pages.
Final Office Action dated Apr. 16, 2009; U.S. Appl. No. 11/530,549, filed Sep. 11, 2006; 13 pages.
Notice of Allowance dated Dec. 14, 2009; U.S. Appl. No. 11/530,549, filed Sep. 11, 2006; 10 pages.
Office Action dated Oct. 4, 2010; U.S. Appl. No. 12/720,458, filed Mar. 9, 2010; 15 pages.
Final Office Action dated Mar. 22, 2011; U.S. Appl. No. 12/720,458, filed Mar. 9, 2010; 13 pages.
Notice of Allowance dated Jun. 8, 2011; U.S. Appl. No. 12/720,458, filed Mar. 9, 2010; 7 pages.
European Summons to Attend Oral Proceedings; Application No. 06120472.3; Sep. 23, 2009; 5 pages.
Office Action dated Mar. 28, 2008; U.S. Appl. No. 11/530,553, filed Sep. 11, 2006; 18 pages.
Office Action dated Oct. 8, 2008; U.S. Appl. No. 11/530,553, filed Sep. 11, 2006; 14 pages.
Final Office Action dated Apr. 29, 2009; U.S. Appl. No. 11/530,553, filed Sep. 11, 2006; 14 pages.
Notice of Allowance dated Dec. 11, 2009; U.S. Appl. No. 11/530,553, filed Sep. 11, 2006; 7 pages.
European Extended Search Report; Application No. 06120471.5; Feb. 19, 2007; 7 pages.
European Examination Report; Application No. 06120471.5; Feb. 13, 2009; 4 pages.
European Extended Search Report; Application No. 10152707.5; Mar. 18, 2010; 6 pages.
European Examination Report; Application No. 10152707.5; Dec. 10, 2010; 5 pages.
European Summons to Attend Oral Proceedings; Application No. 10152707.5; May 19, 2011; 3 pages.
European Extended Search Report; Application No. 06120472.3; Feb. 19, 2007; 7 pages.
European Examination Report; Application No. 06120472.3; Feb. 13, 2009; 4 pages.

* cited by examiner

METHOD AND APPARATUS FOR ENABLING ENHANCED USB INTERACTION

CROSS-REFERENCE TO RELATED APPLICATIONS

This is a continuation application of and claims priority to U.S. patent application Ser. No. 12/720,458 filed Mar. 9, 2010 by Maxime Matt, et al. and entitled "Method and Apparatus for Enabling Enhanced USB Interaction", which is a continuation of U.S. Pat. No. 7,707,323 issued Apr. 27, 2010 by Maxime Matton, et al. and entitled "Method and Apparatus for Enabling Enhanced USB Interaction", which is incorporated herein by reference for all purposes. This application is related to U.S. Pat. No. 7,711,863 issued May 4, 2010 Ser. No. 11/530,553, which is incorporated herein by reference for all purposes.

BACKGROUND

The disclosure relates generally to USB hosts and peripheral devices, and more particularly, to apparatus and method for manipulating the support provided for USB by an operating system that is executed by a processor of a host to enable varying degrees of functionality in interactions between the host and a peripheral device attached to the host via USB interconnect.

A number of years ago, a group of computer and computer peripheral manufacturers formed an industry association to create a new digital interface for interconnecting various electronic devices. This new digital interface became and is widely known as USB (Universal Serial Bus). USB is a point-to-point interface in which there is a distinct master device (commonly referred to as a "host") and a distinct slave device (commonly referred to as a "peripheral device"). USB is most commonly used to connect one or more peripheral devices (e.g., scanners, cameras, printers and removable media drives) to a single host device (usually, a computer system such as a personal computer).

USB permits electronic devices to be attached to each other, automatically configured upon detection of their attachment, and detached from each other while still in operation. In other words, USB provides "hot-plugging" support that includes automatic configuration. To facilitate this, specifications were drafted for minimum requirements for a protocol for the automatic configuration and for support to be provided by an operating system executed by a processor of the host for "on-the-fly" changes of peripheral devices, in addition to specifications for the hardware interface.

Upon attachment of a peripheral device to a host, the host requests and the peripheral device provides identification data, including a vendor identity code and one or more device class codes. Vendors of peripheral devices for USB are assigned identity codes to allow their products to be distinguished from those of other vendors. A number of device class codes are defined for USB with each device class code specifying a function that a peripheral device may be capable of performing, such as the human interface device class (e.g., keyboards, mice and joysticks), the printing device class (e.g., dot matrix printers, ink jet printers and color printers), the scanning device class (e.g., flatbed scanners), and the mass storage device class (e.g., hard disk drives, removable media drives and flash memory devices). A peripheral device may be capable of performing multiple functions, and therefore, would provide multiple device class codes in the identification information sent to the host.

The identification data is used by an operating system executed by a processor of the host to select one or more pieces of support software from whatever pieces of support software are loaded onto the host to support interactions between the host and the peripheral device to allow the host to make use of the functions specified by the peripheral device in its identification data. To aid the selection of pieces of support software, each piece of support software carries data that at least partially mirrors the types of information provided by identification data from a peripheral device. A piece of vendor-specific support software supports only the peripheral devices of a specific vendor and provides the operating system with a vendor identity code specifying that vendor, whereas generic support software is not limited to supporting only the peripheral devices of a specific vendor. Both vendor-specific and generic support software further provide the operating system with device class codes specifying what peripheral device functions are supported by the support software. It should be noted that it is possible for a piece of support software, whether vendor-specific or generic, to support only a single peripheral device function or to support multiple functions. It is also possible that a piece of support software supports only a subset of the functions specified by device class codes of the identification data of a given peripheral device such that multiple pieces of support software must be selected to support all of the functions of that peripheral device.

In selecting support software to support interactions with each peripheral device attached to the host, the operating system endeavors to achieve the best fit between each peripheral device and whatever support software is loaded on the host. It is generally accepted that the best possible fit is achieved by matching a given peripheral device with vendor-specific support software that is of the same vendor and that supports all of the functions specified by the device class codes in the identification data supplied by that peripheral device (whether this is with a single piece of vendor-specific support software, or multiple pieces). This is based on the presumption that the vendor of a given peripheral device will be in the best position to provide software that best supports it. However, where either there is no vendor-specific support software specifying that vendor, or there is insufficient vendor-specific support software to support all of the functions of the given peripheral device, then the operating system may choose generic support software to support some or all of the functions of that peripheral device. However, if there proves not to be either vendor-specific or generic support software present to support all of the functions specified by a given peripheral device by the device class codes of its identification data, then the operating system presents the user with a request to load the missing support software onto the host.

Since the introduction of USB circa 1995, various trends have arisen in how computers or other electronic devices functioning as hosts to one or more attached peripheral devices are employed by their users, such as which vendors' peripheral devices and/or which peripheral device functions are more widely desired. Since it is generally not practical for a vendor of an electronic device functioning as a host to provide all known pieces of support software for all peripheral devices already loaded on those electronic devices, such vendors often attempt to anticipate which peripheral devices or peripheral device functions (i.e., which classes of peripheral device) are most likely to be desired by users, and to load onto their products a subset of support software sufficient to support those users. The result has been that some functions that a peripheral device may provide may be very widely supported with the necessary support software already being loaded onto the vast majority of hosts by their vendors such that few users are ever presented with a request to load software for such functions. However, this leaves other functions that a peripheral device may provide with less certainty in the availability of software support. Most users of computer systems or other electronic devices functioning as hosts to one or more attached devices will find themselves asked to load support software at some point.

Although many users of computer systems or other electronic devices functioning as hosts to one or more attached peripheral devices will understand the meaning of a request presented to them to load supporting software, many other users will not. Furthermore, actually satisfying such a request often entails a search for the requested software, either by searching for a storage medium (such as a CD) that accompanied the peripheral device when purchased or by searching for a website from which the requested software may be downloaded. Although operating systems making requests for support software to be loaded by a user is arguably the logic result of the necessary support software not already being loaded on a host, and is in fact the current conventional result, due to the inconvenience caused to both savvy and not-so-savvy users, this result is not seen as being entirely satisfactory.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
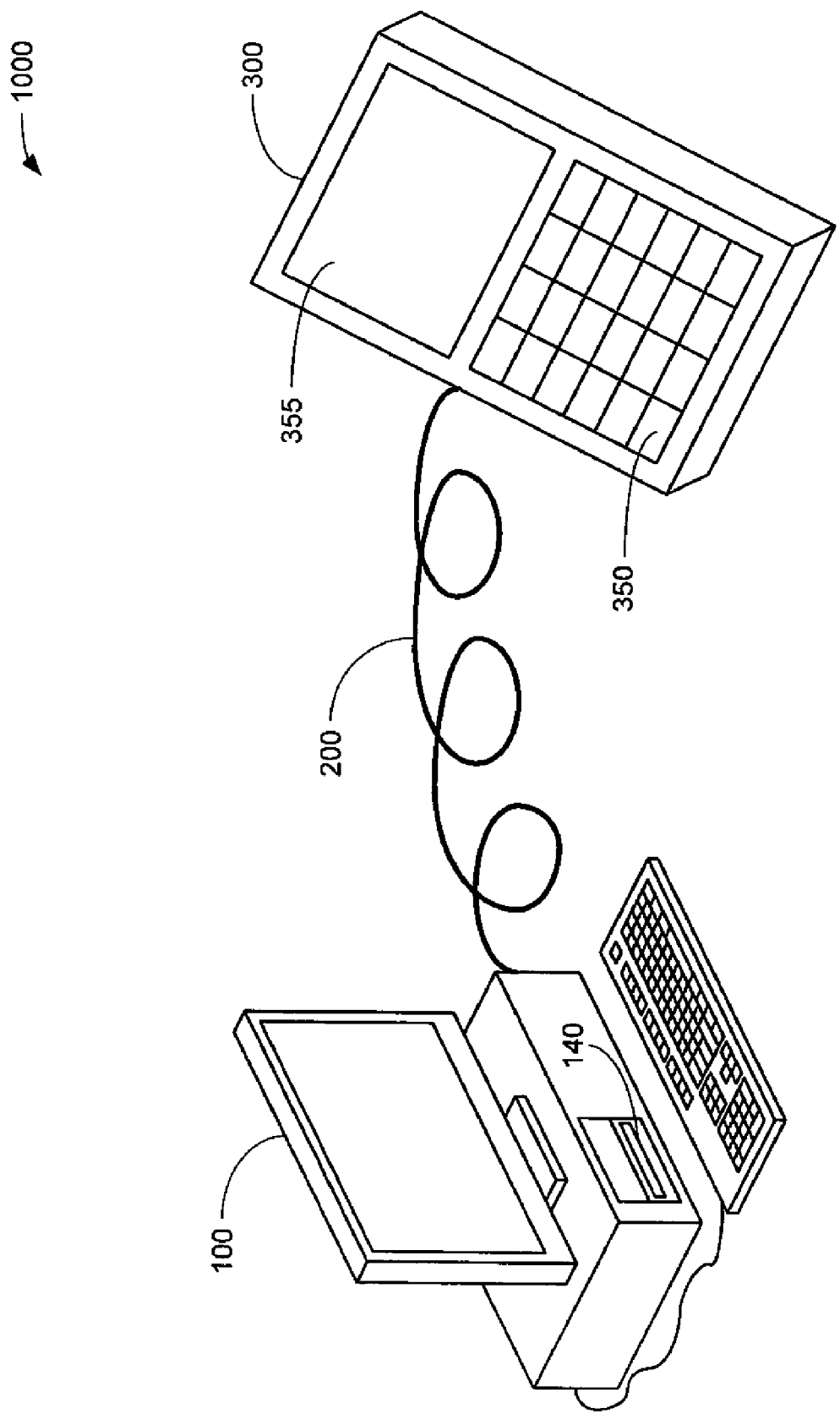
FIG. 1 is a view of embodiments of improved electronic devices in accordance with the disclosed and claimed concept.
Figure 2:
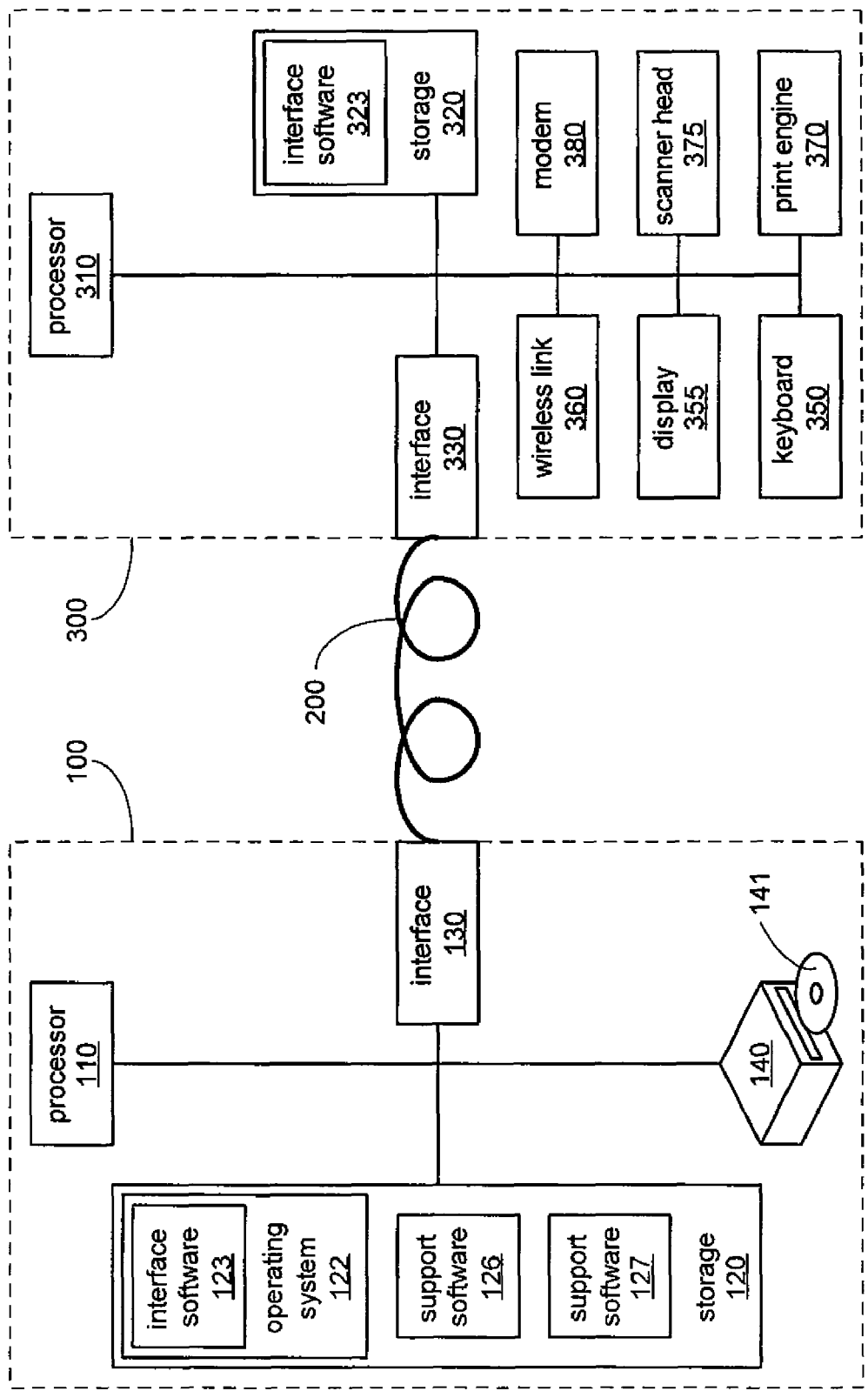
FIG. 2 is a schematic depiction of the improved electronic devices of FIG. 1.

FIGS. 1 and 2 depict a pair of electronic devices 1000 that includes electronic devices 100 and 300 attached via a USB interconnect 200, wherein the electronic device 100 functions as a host and the electronic device 300 functions as a peripheral device. As depicted in FIG. 1, the electronic device 100 may be a computer system optionally having a media storage device 140 by which software and/or data, including an operating system and/or support software, may be loaded onto the electronic system 100. Also as depicted in FIG. 1, the electronic device 300 may be a handheld electronic device (e.g. and without limitation, a PDA, a cell phone, handheld GPS receiver, or handheld scanner), and may optionally have one or more of a keyboard 350, a display 355 and a wireless link 360. Alternatively, the electronic device 300 may be a multi-function office machine combining printing, scanning and faxing functions, and may optionally have one or more of a print engine 370, a scanner head 375 and a modem 380.

However, despite these particular depictions and descriptions of what the electronic devices 100 and 300 may be, it will be apparent to those skilled in the art that other embodiments of the pair of electronic devices 100 are possible in which the electronic devices 100 and 300 are each electronic devices of any of a variety of types, including and without limitation, industrial control devices, digital music instruments, scientific measuring devices, office machines, network interfaces and network appliances. More specifically, as a peripheral device the electronic device 300 may perform any of a variety of possible functions to augment the functionality of the electronic device 100, including but not limited to, accessing wireless communications, displaying data, accepting keyboard input, printing, scanning, barcode reading, providing remote control of appliances, GPS location and sensor monitoring.

Focusing more on FIG. 2, electronic device 100 incorporates a processor 110 connected to a storage 120 and an interface 130. As discussed earlier, the electronic device 100 may also incorporate the media storage device 140 capable of interacting with storage medium 141 (which may or may not be a form of removable media) to store and/or retrieve software and/or data. The processor 110 accesses the storage 120 to retrieve and execute sequences of instructions comprising software, such as interface software 123, support software 126 and support software 127. The interface 130 provides a USB-compliant interface, including requisite clock and data signaling, by which the electronic device 100 may be attached to another electronic device, such as the electronic device 300, via the USB interconnect 200. The interface software 123 provides a sequence of instructions, that when executed by the processor 110, causes the processor 110 to perform operations in support of interactions between the electronic devices 100 and 300 through the interface 130 and the USB interconnect 200. As will be explained, among those operations is requesting identification data from the electronic device 300, responding to receiving identification data from the electronic device 300, and selecting appropriate support software from among support software already loaded into the electronic device 100 in response to the contents of the received identification data.

The electronic device 300 incorporates a processor 310 connected to a storage 320 and an interface 330. As discussed earlier, the electronic device 300 may also incorporate one or more of the keyboard 350, the display 355, the wireless link 360, the print engine 370, the scanner head 375 and the modem 380. The processor 310 accesses the storage 320 to retrieve and execute sequences of instructions comprising pieces of software, such as interface software 323. The interface 330 provides a USB-compliant hardware interface, including clock and data signaling, by which the electronic device 300 may be attached to another electronic device, such as the electronic device 100 via the USB interconnect 200. The interface software 323 provides a sequence of instructions, that when executed by the processor 310, causes the processor 310 to perform operations in support of interactions between the electronic devices 100 and 300 through the interface 330 and the USB interconnect 200. As will be discussed, among those operations is providing identification data to the electronic device 300, and controlling the interface 330 to simulate the acts of attaching and detaching the electronic device 300 to and from the electronic device 100.

As those skilled in the art will readily recognize, the processors 110 and 310 may be of any of a wide variety of processing devices, including and without limitation, microcontrollers, microprocessors, sequencers, digital signal processors or state machines implemented in hardware logic. In some embodiments, the processor 110 may be one of a number of commercially available processors executing at least a portion of the widely known and used "X86" instruction set. Also, although depicted as part of the operating system 122, the interface software 123 may be a separately provided piece of software that augments the operating system 122 with the capability to control the interface 130. The operating system 122 may be any of a wide variety of operating systems, including and without limitation, a version of UNIX, a version of the Windows operating system provided by Microsoft Corporation, or a version of LINUX. Furthermore, the storages 120 and 320 may be of any of a wide variety of types of storage devices, including and without limitation, disk drives (e.g. and without limitation, hard drives, floppy drives, magneto-optical drives, magnetic tape drives or CD-ROM drives), solid state memory (e.g. and without limitation, static RAM, dynamic RAM, ROM, EEPROM or FLASH) and memory card readers.

Although the USB interconnect 200 is depicted and discussed herein as being a cable coupling together the electronic devices 100 and 300 by the interfaces 130 and 330, respectively, and although currently commonplace implementations of USB cabling provide an electrical connection, those skilled in the art and those familiar with proposed future developments in USB will readily recognize that other implementations of USB interconnect 200 are possible. These other possible implementations include, without limitation, fiber optic cabling and various forms of wireless interconnect employing infrared or radio frequency transmissions. Where the USB interconnect 200 is implemented as either a cable conducting electrical signals between the electronic devices 100 and 300 or a fiber optic cable conducting light signals between the electronic devices 100 and 300, at least one or both ends of the USB interconnect 200 is connected to the corresponding one or both of interfaces 130 and 330 via detachable connectors.

The electronic devices 100 and 300 implement various aspects of USB, including the distinct roles of host and peripheral device in controlling activity across the USB interconnect 200, and permitting hot-plugging. Electronic device 100, with the processor 110 executing a sequence of instructions within the interface software 123, functions as the host, and the electronic device 300, with the processor 310 executing a sequence of instructions within the interface software 323, functions as the peripheral device.

When the electronic devices 100 and 300 are attached to each other through the USB interconnect 200, the interface 130 receives an indication that a peripheral device has been attached. In embodiments where the USB interconnect 200 is implemented as an electrical cable, this indication of a peripheral device being attached is received by the interface 130 as a change in an electrical property of a clock and/or data signal of the USB interface provided by the interface 130. In embodiments where the USB interconnect 200 is implemented as a fiber optic cable or other form of interconnect, the interface 130 may receive this indication in any of a number of other possible ways, including and without limitation, by detecting clock and/or data signal activity, by detecting a beam of light, or by receiving a modulated signal of a specific frequency.

Regardless of how the attachment is detected, the processor 110 is signaled by the interface 130 that an indication of the attachment of a peripheral device has been received. In response, the processor 110 retrieves from the storage 120 and executes a sequence of instructions of the host interface software 123, causing the processor 110 to operate the interface 130 to signal the electronic device 100 across the USB interconnect 200 to provide identification data in accordance with USB protocols. Alternatively, the interface 130 may be capable of requesting the identification data in response to detecting the attachment of the peripheral device without the interface software 123 having to cause the processor 110 to operate the interface 130 to do so. Regardless of how the request is generated within the electronic device 100, the processor 310 of the electronic device 300 is signaled by the interface 330 that a request for identification data has been received. In response to this request, the processor 310 retrieves from the storage 320 and executes a sequence of instructions of the interface software 323 that cause the processor 310 to send identification data to the electronic device 100 to enable the interface software 123 executed by the processor 100 to select appropriate support software to enable interaction between the electronic devices 100 and 300, and thereby, enable the electronic device 100 to utilize one or more functions that the electronic device 300 is capable of performing.

However, as previously discussed in the earlier "Background" section, it is entirely possible that insufficient support software for supporting all of the functions of the electronic device 300 has been loaded into the electronic device 100 at the time that the electronic devices 100 and 300 are attached such that there isn't sufficient vendor-specific and/or generic support software available in the storage 120 to be selected to support all of those functions. To induce the interface software 123 in such a situation to not engage in the conventional behavior of requesting that the user of the electronic device 100 load additional software, the identification data provided by the electronic device 300 is a first identification data that correctly specifies its vendor, but provides at least one device class code that either incorrectly or incompletely specifies the functions that the electronic device 300 is capable of performing. In other words, a device class code is provided in the first identification software that takes advantage of the earlier discussed trends in the provision of support software by specifying a function that has a high likelihood of being supported by at least a generic support software already loaded onto the electronic system 100. The function specified by this device class code may be a subset of a fuller range of functions performable by the electronic device 300 or may be a function entirely outside the range of functions actually performable by the electronic device 300. To put it yet another way, the electronic device 300 initially describes itself in the first identification data as being a peripheral device that performs a very widely supported function for which there is a high likelihood of a piece of support software being loaded on the electronic device 100, regardless of whether the electronic device 300 actually performs that function, or not.

After the transmission of the first identification data, the processor 110 is signaled by the interface 130 of the receipt of the first identification data from the electronic device 300, and in executing further instructions of the host interface software 123, the processor 110 is caused to use the received identification data to select an appropriate piece of support software. Which piece of support software is selected depends, in part, on what pieces of support software have already been loaded onto the electronic device 100. For the sake of clarity in continuing this discussion, we will presume that the support software 126 depicted in FIG. 2 is a piece of generic support software that supports the function specified by the device class code provided in the first identification data regardless of vendor. We will also presume that the support software 127, also depicted in FIG. 2, is a piece of vendor-specific support software that supports numerous functions, including the function specified by the device class code provided in the first identification data, but only for peripheral devices of the same vendor as was specified in the first identification data, including the electronic device 300, and not peripheral devices of other vendors.

If the support software 126 is loaded onto the electronic device 100, but the support software 127 is not, such that the support software 126 is stored in the storage 120, but not the support software 127, then the interface software 123 will select the support software 126 to enable interaction between the electronic devices 100 and 300 in which the function specified by the device class code provided in the first identification data is supported. As previously discussed, it is seen as preferable to select a vendor-specific piece of support software to support a peripheral device of that vendor, but with the support software 127 not being loaded onto the electronic device 100 (and presuming there is not other vendor-specific support software for that same vendor loaded onto the electronic device 100), the support software 126 becomes the best available choice of support software. In embodiments where the electronic device 300 actually performs the function specified by the device class code provided in the first identification data along with other functions, this enabled interaction, though not utilizing the other functions available on the electronic device 300, does at least provide some benefit from attaching the electronic devices 100 and 300 through the USB interconnect 200 without additional software. In other embodiments where the electronic device 300 does not actually perform the function specified by the device class code provided in the first identification data, this enabled interaction, at the very least, provides the benefit of not burdening the user with a request to install software at that time, such that software installation can be deferred to a later time.

Alternatively, if the support software 127 is loaded onto the electronic system 100, then the interface software 123 will select the support software 127, regardless of whether or not the support software 126 is also loaded onto the electronic system 100, because as explained earlier, a vendor-specific support software that supports the functions specified by the device class codes from a peripheral device of that same vendor is preferred over generic support software. The interface software 123 will have made this selection to enable interaction between the electronic devices 100 and 300 in which the function specified by the device class code provided in the first identification data is supported. However, although the electronic device 300 may have provided a device class code specifying a function that it claims to perform, and although the support software 127 may have specified that it supports that same function, the primary reason for arranging for both the electronic device 300 and the support software 127 to specify the same vendor and same function is to ensure that the interface software 123 is induced to select the support software 127 over any generic support software that may also be loaded onto the electronic device 100. Regardless of whether the electronic device 300 actually performs that function and regardless of whether the support software 127 actually supports that function, the primary goal is to cause the support software 127 to be selected and then executed by the processor 110.

Upon being executed by the processor 110, at least one sequence of instructions of the support software 127 causes the processor 110 to query the electronic device 300 to determine the true nature of the functions performable by the electronic device 300. In other words, the electronic device 300 is queried to determine whether or not the function specified by the device class code provided in the first identification data is really a function that the electronic device 300 performs, and to determine whether or not there are other functions that the electronic device 300 is able to perform. This query could be in the form of a request sent to the electronic device 100 to transmit further data containing one or more bit or byte values indicating the true range of functionality of the electronic device 100. Alternatively, where the function specified by the device class code provided in the first identification data is that of a mass storage device, this query could be in the form of a test for the presence of a particular file having a particular file name or other particular characteristic.

In some embodiments, the mere act of querying the electronic device 300 is treated as a signal to the electronic device 300 that sufficient support software to support greater functionality in interactions between the electronic devices 100 and 300 has been loaded onto the electronic device 100. The assumption is made that if such support software were not loaded onto the electronic device 100, then this query would not have been made. This query, therefore, is used as the trigger for the interface software 323 to take further action to enable more or different functionality than was specified by the device class code provided in the first identification data. In response to this query, the interface software 323 causes the processor to operate the interface 330 to simulate a detachment of the electronic device 300 from the electronic device 100 and then to simulate an attachment. In response to detecting through the interface 130 the apparent (although simulated) attachment of the electronic device 300 to the electronic device 100, again, the interface software 123 causes the processor 110 to again request identification data from the electronic device 300. This time, in response to this request after the simulated attachment, the software 123 causes a second identification data to be sent to the electronic device 100, and this second identification data correctly identifies both the vendor of the electronic device 300 and one or more device class codes that correctly specify the functions that the electronic device 300 is capable of performing. Upon receiving the second identification data, the interface software 123 once again selects the support software 127 to support interactions between the electronic devices 100 and 300 as a result of matching the vendors and functions specified by both the second identification data and the support software 127. With the support software 127 selected, interactions between the electronic devices 100 and 300 are enabled on the basis of the electronic device 300 being treated as being capable of all of the functions specified by the device class codes provided in the second identification data.

In other embodiments, the act of querying the electronic device 300 is expected to be responded to with an indication from the electronic device 300 that it is capable of more or different functionality than was indicated by the device class code provided in the first identification data. In response to receiving this indication, the electronic device 100 sends an additional signal to the electronic device 300 that sufficient support software to support greater functionality in interactions between the electronic devices 100 and 300 has been loaded onto the electronic device 100. This additional signal is used as the trigger for the interface software 323 to cause the simulated detachment and attachment, as well as the sending of a second identification data. This additional signal may be, and without limitation, an explicit command to perform a software detachment and attachment, a specific sequence of bus activity on the USB interconnect 200, or an access made to a data location within the electronic device 300. As a result of the simulated detach and attach, and the sending of the second identification data more correctly specifying the actual range of functionality of the electronic device 300, the support software 127 is selected and interaction between the electronic devices 100 and 300 is enabled with the electronic device 300 treated as being capable of all of those specified functions.

Regardless of what triggers the simulated detachment and attachment behaviors and the sending of a second identification data by the electronic device 300, in some embodiments, which device class codes are actually provided in the second identification data is controllable through the support software 127. In these embodiments, an opportunity is provided for either a person installing the support software 127 or for a person using the electronic devices 100 and/or 300 to select what functions of the electronic device 300 will be enabled in interactions between the electronic devices 100 and 300. There may be security reasons, corporate policy reasons or other reasons why either a user of the electronic devices 100 and/or 300, or another person, may desire to limit the kinds of functionality that will be supported in interactions between the electronic devices 100 and 300. In this case, configuration data is maintained in some form (e.g., and without limitation, in a file stored on the electronic device 100) that includes the selections of which of the functions that the electronic device 300 is capable of performing will actually be enabled in the interactions between the electronic devices 100 and 300 following the previously described simulated detachment and attachment, and sending of the second identification data. Either with a query serving as a trigger or with the sending of the additional signal, the selection of which functions are to be enabled is also sent to the electronic device 300, and in response, when the second identification data is sent to the electronic device 100, only device class codes consistent with the functions of the electronic device 300 that were selected to be enabled are provided in the second identification data.

Controlling which device class codes are provided in the second identification data in this way prevents the interface software 123 from ever searching for support software that supports the undesired functions. This may prove advantageous by allowing the provision of more limited variations of the support software 127, with some of those variations supporting only the desired functions, and making it possible for one of these more limited variations to be loaded onto the electronic device 100 in place of a fuller function version of the support software 127. Since the interface software 123 will only seek to match the functions specified by the device class codes provided in the second identification data with support software needed to support those functions, a more limited variation of the support software 127 will still be selected by the interface software 123 over whatever pieces of generic support software may be loaded on the electronic device 100, regardless of how much more functionality those pieces of generic support software may support.

To further illustrate this enabling of various functions of the electronic device 300 in interactions between the electronic devices 100 and 300, examples where the electronic device 100 is a typical computer system and where the electronic device 300 is either a PDA or a multifunction printer will now be presented. Where the electronic device 300 is a PDA, the electronic device 300 may be capable of storing various pieces of information including, but not limited to, an address book, calendar, spreadsheets, documents and pictures. Furthermore, as a PDA, the electronic device 300 may also be capable of playing music, engaging in wireless communications with the internet or other nearby electronic devices, tuning in radio or TV stations, or receiving GPS signals to provide a user with information concerning current location. When attached to another electronic device, such as the electronic device 100, the electronic device 300 may be capable of synchronizing addresses and scheduling data with the electronic device 100, and may be capable of uploading and/or downloading maps with GPS coordinates and/or music files for entertainment. Where the electronic device 300 is a multifunction printer, the electronic device 300 may be capable of scanning pages to a computer or network-attached storage device, sending and receiving faxes (perhaps including network faxing), making copies and printing documents received from a computer. Furthermore, as a multifunction printer, the electronic device 300 may also be capable of faxing documents transmitted to it from a computer, converting documents between electronic file formats, exchanging email addresses and/or phone numbers by which electronic documents are exchanged, or uploading or downloading fonts or color correction algorithms.

Upon attachment of the electronic device 300 to the electronic device 100, the electronic device 100 requests identification data from the electronic device 300. As previously discussed, software support for all the functions of either the PDA or multifunction printer variations of the electronic device 300 may not have been loaded onto the electronic device 100. Therefore, to enable at least some form of interaction between the electronic devices 100 and 300, the PDA and multifunction printer variants may send identification data that correctly specifies their vendors, but which may provide only the device class code of a mass storage device. It may be that only one or the other or neither of the PDA or multifunction printer variants of the electronic device 300 actually perform the mass storage device function when attached to the electronic device 100, but the primary reason for specifying the mass storage device function is that as a result of earlier-discussed trends, the mass storage device function is widely supported with support software tending to already be loaded onto typical computer systems. It should be noted that there are other widely supported functions, such as human interface devices or printing devices, for which a device class code could be provided in the first identification data in lieu of the device class code for mass storage devices. The use of a device class code for mass storage devices is meant only to facilitate discussion in this example, and should not be taken as limiting.

If the electronic device 100 has the generic support software 126 loaded thereon that supports the mass storage device function without regard to vendor, but not the vendor-specific support software 127 from the vendors of either the PDA or multifunction printer variants of the electronic device 300 loaded onto the electronic device 100, then the interface software 123 will cause the processor 110 to choose the support software 126 to provide support for interactions between the electronic devices 100 and 300. As a result, a user of the electronic device 100 will be able to treat each of the PDA and multifunction printer variants of the electronic device 300 as a storage device onto which they may store and retrieve data from the electronic device 100, provided that each of the PDA and multifunction printer variants actually supports the mass storage device function. It is possible that this level of functionality may be sufficient for the needs of a user, at least at that time, inasmuch as the user may simply have been seeking to load some music onto the PDA variant of the electronic device 300 or to update the fonts used by the multifunction printer variant of the electronic device 300. However, to make use of the PDA variant as an FM tuner to receive music to be played on speakers attached to the electronic device 100, or to make use of the multifunction printer variant as a scanner to scan pictures into the electronic device 100, additional support software beyond the support software 126 may well be needed. Without loading vendor-specific support software intended to support either of these variants of the electronic devices 300, no additional functionality in interactions between the electronic devices 100 and 300 will be enabled.

If the electronic device 100 has vendor specific support software 127 loaded thereon that is specific to the vendors of the PDA and multifunction printer variants of the electronic device 300, then the receipt of the first identification data specifying the vendor of the electronic device 300 and providing a device class code for a function that the support software 127 has also specified will induce the interface software 123 to select the support software 127. As previously stated, it may be that neither of the PDA or multifunction printer variants of the electronic device 300 actually support whatever function is specified by the device class code provided in the first identification data, but this is unimportant. The primary reason for causing the interface software 123 to select the support software 127 is because the support software 127 has a sequence of instructions that when executed by the processor 110, causes the processor 110 to carry out further operations that will further enable interactions between the electronic devices 100 and 300 in which a greater range of the functionality of the electronic device 300 can be utilized. Upon being selected and then executed, the support software 127 makes an inquiry of the electronic device 300 to determine if the electronic device 300 is capable of more or different functionality than originally indicated in the first identification data.

As previously discussed, the very act of making this inquiry may be the necessary indication to the electronic device 300 that the support software 127 is loaded onto the electronic device 100 to trigger the electronic device 300 to take further actions to make use of more of the true capabilities of the electronic device 300, or may simply result in the electronic device 300 responding with an indication of what its true capabilities are. If the latter is the case, then the electronic device 100 is caused by the support software 127 to send an additional signal to the electronic device 300 to trigger those further actions. Regardless of how the electronic device 300 is triggered to take further actions, the electronic device responds to being triggered by simulating a detachment from and then an attachment to the electronic device 100. In response to the apparent attachment, the electronic device 100 request identification data from the electronic device 300, again. This time, however, the electronic device 300 sends a second identification data in which the vendor of the electronic device is again correctly specified, but which now also provides device class codes specifying a more correct picture of the range of capabilities of the electronic device 300. Upon receipt of this second identification data, the interface software 123 again selects the support software 127, but the primary purpose in causing the support software 127 to be selected this time is to actually support the larger range of functionality specified in the second identification data in interactions between the electronic devices 100 and 300.

However, as previously discussed, there may be reasons for not enabling all of the possible functionality that either the PDA or multifunction printer variants could support when attached to the electronic device 100 with the support software 127 loaded thereon. It may be that the electronic device 100 is provided to its user by the user's employer and the employer does not want to have such functions as music being played on the electronic device 100 from radio stations received by a tuner built into the PDA variant. Or, it may be that the owner of the multifunction printer variant does not want it to have another member of his family using the multifunction printer variant to electronic documents residing on the electronic device 100 as faxes through a fax modem built into the multifunction printer variant. In each of these cases, the support software 127 may provide the facility to configure exactly what functions of the electronic device 300 will be supported when attached to the electronic device 100. The selections made whatever person employing the configuration facility are then transmitted by the support software 127 to the electronic device 300 either when the query of the capabilities of the electronic device 300 is made or when an additional signal is sent to the electronic device 300. Then, when the electronic device 300 sends the second identification data, only device class codes specifying functions that were selected through the configuration facility will be provided in the second identification data.

Figure 3:
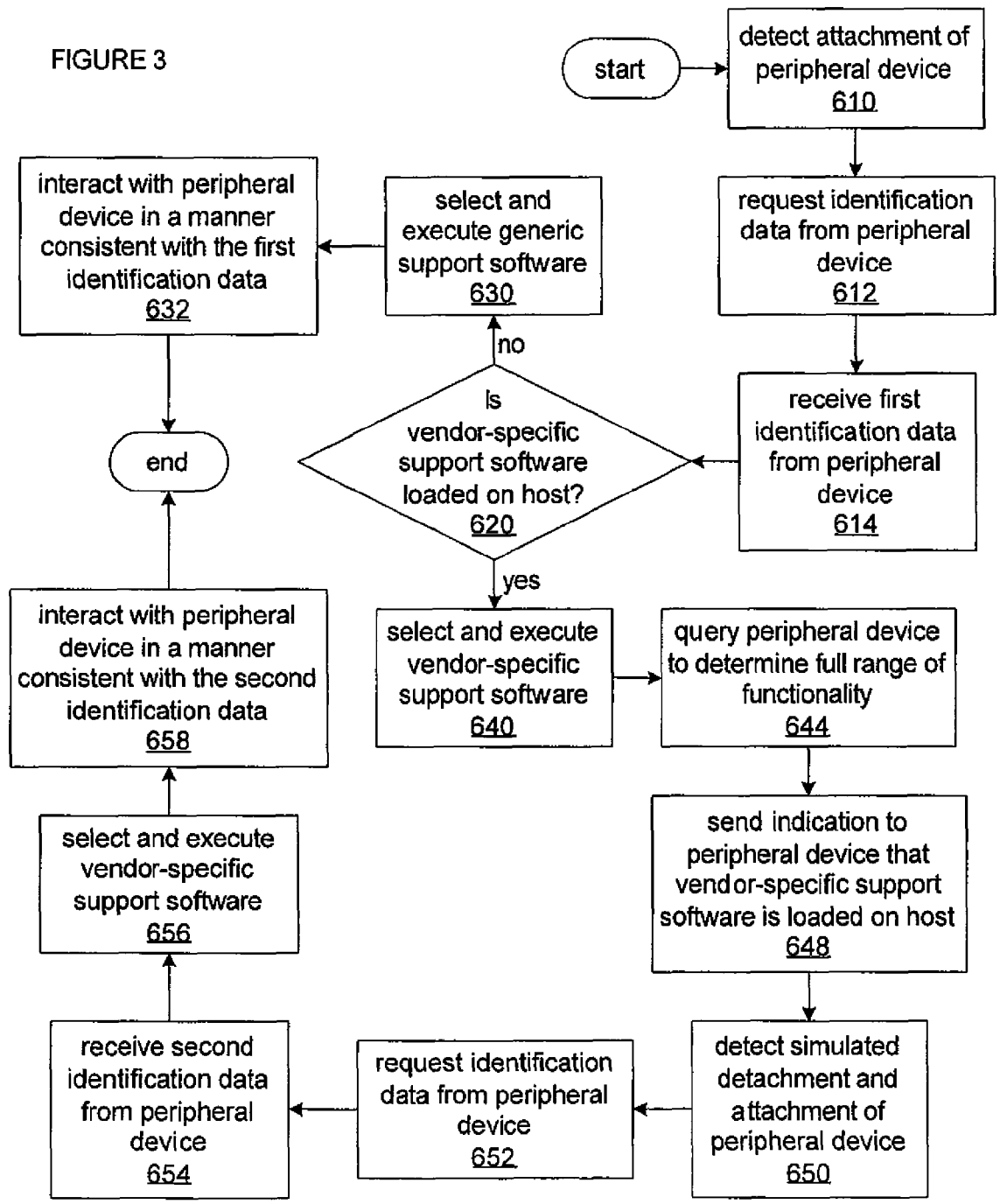
FIG. 3 is a flowchart of an embodiment of an improved method in accordance with the disclosed and claimed concept.

FIG. 3 is a flow chart of an embodiment of a host enabling interaction with a peripheral device. Starting at 610, the host detects the attachment of a peripheral device, and in response, requests identification data from the peripheral device at 612. The host then awaits receipt of the identification data from the peripheral device, and at 614, receives a first identification data from the peripheral device. The peripheral device may represent itself as being a mass storage device, a human interface device, or any of a variety of other possible classes of device chosen to be likely to be supported by software likely to be found on a host. In response to the receipt of the first identification data, the host uses the vendor identification code and/or the device class code within the first identification data to select and execute an appropriate piece of support software already loaded on the host.

At 620, if vendor-specific support software specifying a vendor that matches the vendor specified in the first identification data has not been loaded onto the host, then a generic support software that supports peripheral devices of the device class that the peripheral device has claimed to be is selected and executed at 630. With such a generic support software loaded, the host interacts with the peripheral device in a manner consistent with the first identification data wherein the peripheral device is treated as being capable of performing only the function specified by the device class code provided in the first identification data.

However, at 620, if such matching vendor-specific support software has been loaded, then the vendor-specific support software is selected and executed at 640. In being executed, the vendor-specific support software specific causes a query to be made of the peripheral device to determine the full range of functionality of the peripheral device at 644. Upon determining that the full range of capabilities of the peripheral device is other than what was specified in the first identification data, the vendor-specific support software sends an indication to the peripheral device that such software has been loaded on the host at 648, thereby being available to be selected. In some embodiments, the query sent to the peripheral device at 644 may also serve as the indication sent to the peripheral device at 648, based on the assumption that no such query would be made if such vendor-specific support software were not loaded onto the host.

In response to the indication sent at 648 that the vendor-specific support software is loaded on the host, the peripheral device simulates a detachment from the host and then an attachment to the host. At 650, the host detects a simulated detachment and a simulated attachment of the peripheral device. At 652, in response to the simulated attachment of the peripheral device, the host again requests identification data from the peripheral device, and at 654, the host receives a second identification data from the peripheral device in which the peripheral device provides device class codes that more completely specify the full range of the capabilities of the peripheral device. In response to the receipt of the second identification data, the host uses the vendor identification code and/or the device class codes within the second identification data to select and execute an appropriate piece of support software at 656, and the selection made is the vendor-specific support software, since the vendor and device class codes match. At 658, the host interacts with the peripheral device in a manner consistent with the range of functionality specified by the device class codes provided in the second identification data.

Figure 4:
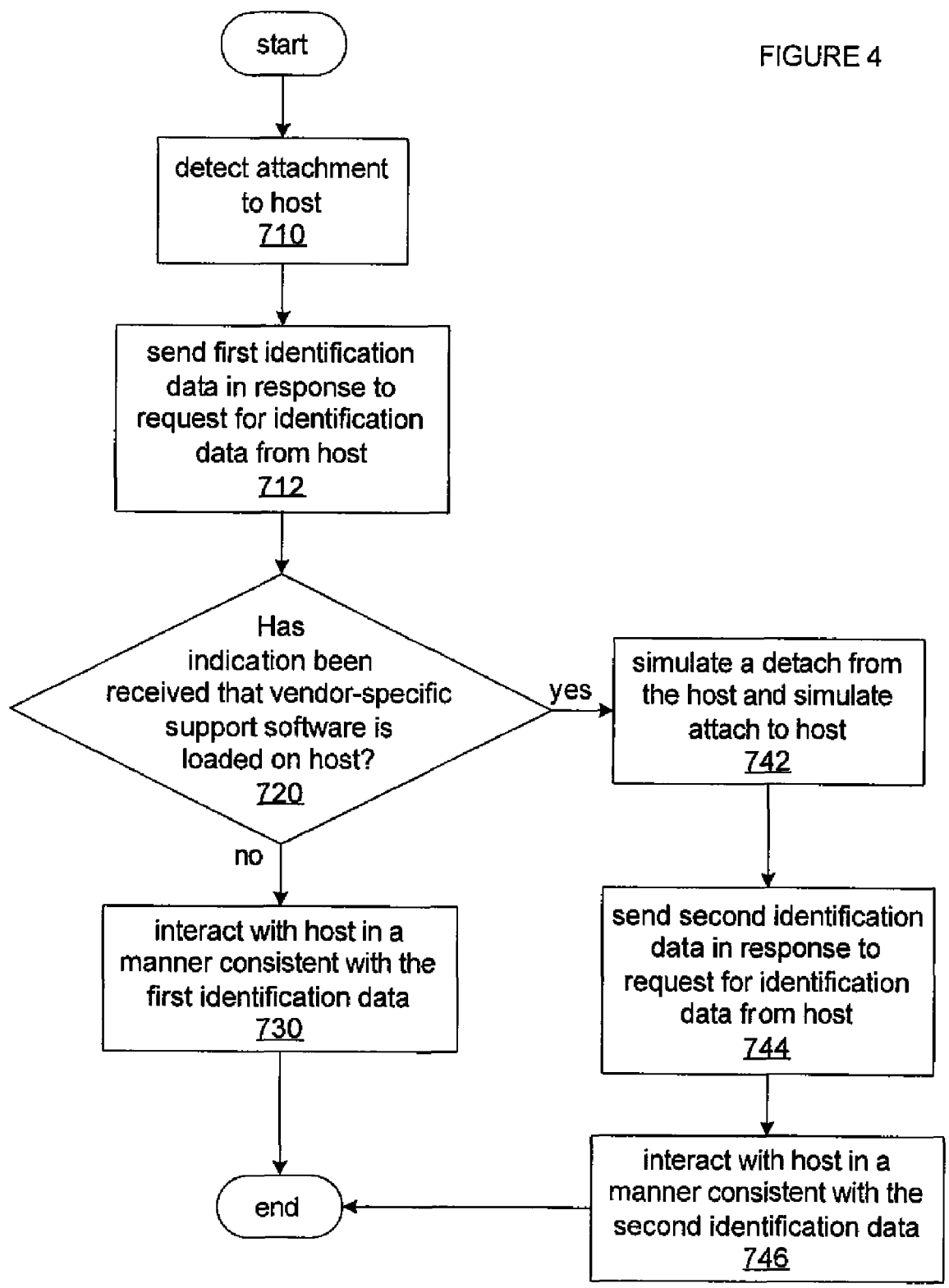
FIG. 4 is a flowchart of another embodiment of an improved method in accordance with the disclosed and claimed concept.

FIG. 4 is a flow chart of an embodiment of a peripheral device enabling interaction with a host. Starting at 710, the peripheral device detects its attachment to the host. At 712, the peripheral device responds to receiving a request for identification data from the host by sending a first identification data to the host. The first identification data correctly specifies the vendor of the peripheral device, but provides a device class code specifying either a function that is a subset of the functions performable by the peripheral device or a function that the peripheral device does not perform, with the function specified or classes to which the peripheral device truly belongs. The device class code is chosen not to correctly reflect what the peripheral device can do, but to specify a function that is highly likely to be supported by support software already loaded on the host. If the host does not have vendor-specific support software loaded thereon that supports the peripheral devices of the same vendor as the attached peripheral device and supporting the functions of the attached peripheral device, then at 720, no indication is received from the host that any such support software is loaded thereon. Without such an indication from the host, the peripheral device simply interacts with the host in a manner consistent with the functionality specified by the device class code provided in the first identification data at 730.

However, if the host does have such vendor-specific support software loaded thereon, then the peripheral device will receive an indication from the host to that effect at 720, and in response, the peripheral device will simulate a detachment and an attachment to the host at 742. At 744, following the simulated detachment and attachment, and in response to the receipt of a new request for identification data from the host, the peripheral device sends a second identification data in which the peripheral device provides device class codes that more correctly specify the functions that the peripheral device is capable of performing, and at 744, the peripheral device now interacts with the host in a manner consistent with the second identification data.

Figure 5:
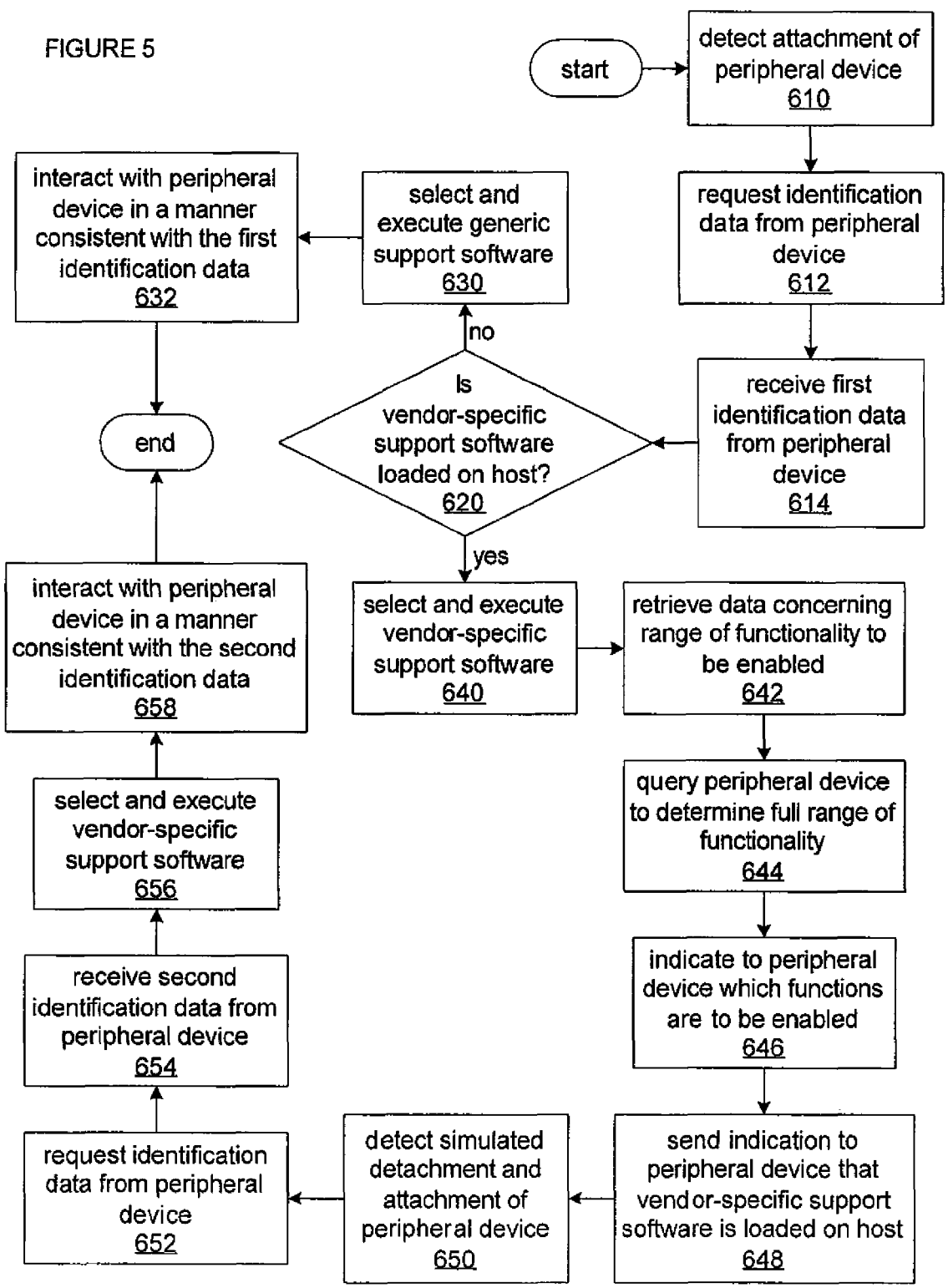
FIG. 5 is a flowchart of another embodiment of the disclosed concept.

FIG. 5 is another flow chart of an embodiment of a host enabling interaction with a peripheral device. FIG. 5 is largely identical to FIG. 3, with all of the steps in common between FIGS. 3 and 5 given identical identifiers. The substantive difference between FIGS. 3 and 5 begins after the vendor-specific support software is selected and executed at 640. Upon being executed, the vendor-specific support software retrieves data concerning what functions have been selected that defines the fuller range of functionality of the peripheral device that is be enabled when a fuller range of interaction is later enabled between the peripheral device and the host. At 644, the query of the peripheral device is made to determine the full range of functionality that the peripheral device is capable of performing. At 646, the range of functions to be enabled based on the data retrieved at 642 is indicated to the peripheral device. At 648, an indication is sent to the peripheral device that the vendor-specific support software is loaded onto the host. As previously discussed with reference to FIG. 3, the query of the peripheral device at 644 may also serve as the sending of an indication at 648 that the vendor-specific software is loaded onto the host. Alternatively, the sending of the indication of what functions are to be enabled at 646 may also serve as either or both of the query to the peripheral device at 644 and the indication concerning the vendor-specific support software at 648. In other words, in order to minimize the amount of communication required, upon retrieving data concerning the range of functions to be enabled at 642, this same data could be sent to the peripheral device as both a query and an indicator of the vendor-specific support software being loaded onto the host, thereby consolidating multiple steps into one. Doing this consolidation is based on the presumption that data concerning which functions are to be enabled would not be sent to the peripheral device if the vendor-specific support software were not loaded on the host.

Figure 6:
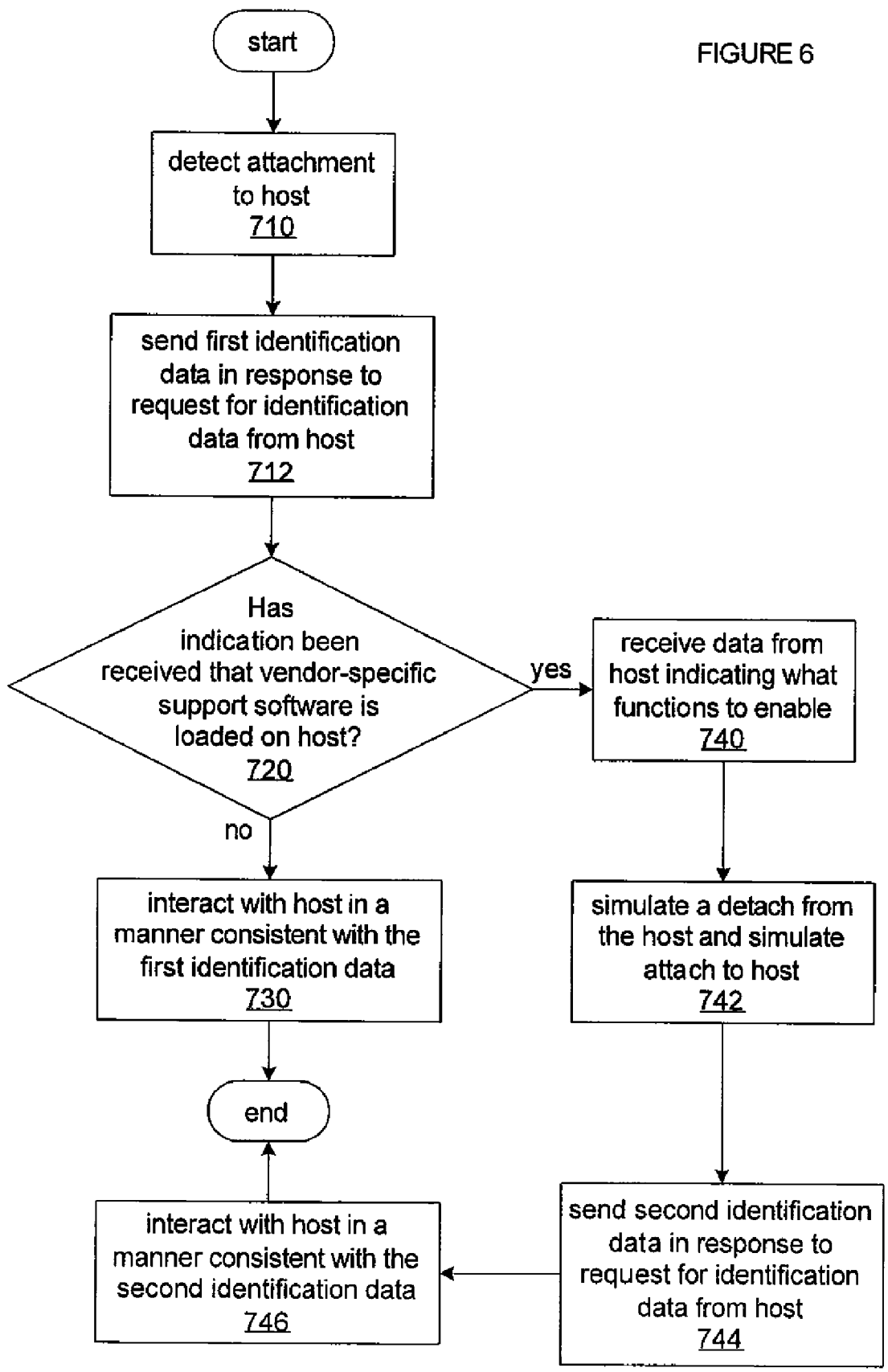
FIG. 6 is a flowchart of another embodiment of the disclosed concept.

FIG. 6 is another flow chart of an embodiment of a peripheral device enabling interaction with a host. FIG. 6 is largely identical to FIG. 4, with all of the steps in common between FIGS. 4 and 6 given identical identifiers. The substantive difference between FIGS. 4 and 6 begins after an indication has been received at 720 that vendor-specific support software is loaded on the host. At 740, data is received from the host indicating what functions out of the full range of functions that the peripheral device is capable of performing are to be enabled with the enabling of a fuller range of interaction between the host and the peripheral device. At 742, the peripheral device performs the simulated detachment from and attachment to the host. As has been previously discussed, the indication that the vendor-specific support software is loaded on the host may also serve as the query of the full range of the capabilities of the peripheral device. And furthermore, as has been discussed, the transmission of the data concerning what functions are to be enabled may also serve as the signal of the vendor-specific support software being loaded on the host. In other words, in order to minimize the amount of communication required, reception of the indication concerning the vendor-specific support software and reception of the data concerning which functions are to be enabled may be one and the same event.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of configuring a universal serial bus (USB) connection by a peripheral device comprising:

sending, at the USB port, first identification data that includes a generic device class code and a vendor identifier;

receiving, at the USB port, a query related to the first identification data, the query indicating software associated with the vendor identifier is supported by the sender of the query;

responding to the query with device information;

simulating a detach and then an attach at the USB port;

receiving, at the USB port, a request for device identification; and sending, at the USB port, second identification data that includes an indication that the peripheral device supports at least one function different from the functionality defined by the generic device class code.

2. The method of claim 1, wherein the sending of the first identification data causes a request to install additional software to not be displayed by the sender of the query.

3. The method of claim 1, wherein the generic device class code indicates a function of the peripheral device that is one of:
   not supported by the peripheral device; and
   a subset of functions that are supported by the peripheral device.

4. The method of claim 1, wherein configuration data is maintained that specifies at least one function that is allowed between the peripheral device and the sender of the query, and wherein the function that is different from the functionality defined by the generic device class code is one of the functions that are allowed between the peripheral device and the sender of the query.

5. A peripheral device comprising:
   a processor configured such that the peripheral device sends, at the USB port, first identification data that includes a generic device class code and a vendor identifier; the peripheral device receives, at the USB port, a query related to the first identification data, the query indicating software associated with the vendor identifier is supported by the sender of the query; the peripheral device responds to the query with device information; the peripheral device simulates a detach and then an attach at the USB port; the peripheral device receives, at the USB port, a request for device identification; and the peripheral device sends, at the USB port, second identification data that includes an indication that the peripheral device supports at least one function different from the functionality defined by the generic device class code.

6. The peripheral device of claim 5, wherein the sending of the first identification data causes a request to install additional software to not be displayed by the sender of the query.

7. The peripheral device of claim 5, wherein the generic device class code indicates a function of the peripheral device that is one of:
   not supported by the peripheral device; and
   a subset of functions that are supported by the peripheral device.

8. The peripheral device of claim 5, wherein configuration data is maintained that specifies at least one function that is allowed between the peripheral device and the sender of the query, and wherein the function that is different from the functionality defined by the generic device class code is one of the functions that are allowed between the peripheral device and the sender of the query.

9. A method of configuring a universal serial bus (USB) connection by a host device comprising:
   receiving, at the USB port, first identification data that includes a generic device class code and a vendor identifier;
   sending, at the USB port, a query related to the first identification data, the query indicating software associated with the vendor identifier is supported by the host device;
   receiving a response to the query, the response containing device information;
   detecting a simulated detach and then a simulated attach at the USB port;
   sending, at the USB port, a request for device identification; and
   receiving, at the USB port, second identification data that includes an indication that the peripheral device supports at least one function different from the functionality defined by the generic device class code.

10. The method of claim 9, wherein receiving the first identification data causes the host device to not display a request to install additional software.

11. The method of claim 9, wherein the generic device class code indicates a function of the peripheral device that is one of:
    not supported by the peripheral device; and
    a subset of functions that are supported by the peripheral device.

12. The method of claim 9, wherein configuration data is maintained that specifies at least one function that is allowed between the host device and the peripheral device, and wherein the function that is different from the functionality defined by the generic device class code is one of the functions that are allowed between the host device and the peripheral device.

13. A host device comprising:
    a processor configured such that the host device receives, at the USB port, first identification data that includes a generic device class code and a vendor identifier; the host device sends, at the USB port, a query related to the first identification data, the query indicating software associated with the vendor identifier is supported by the host device; the host device receives a response to the query, the response containing device information; the host device detects a simulated detach and then a simulated attach at the USB port; the host device sends, at the USB port, a request for device identification; and the host device receives, at the USB port, second identification data that includes an indication that the peripheral device supports at least one function different from the functionality defined by the generic device class code.

14. The host device of claim 13, wherein receiving the first identification data causes the host device to not display a request to install additional software.

15. The host device of Claim13, wherein the generic device class code indicates a function of the peripheral device that is one of:
    not supported by the peripheral device; and
    a subset of functions that are supported by the peripheral device.

16. The host device of claim 13, wherein configuration data is maintained that specifies at least one function that is allowed between the host device and the peripheral device, and wherein the function that is different from the functionality defined by the generic device class code is one of the functions that are allowed between the host device and the peripheral device.

* * * * *